T. HAEGELE.
CARBURETER.
APPLICATION FILED JUNE 16, 1914.
1,152,173.
Patented Aug. 31, 1915.
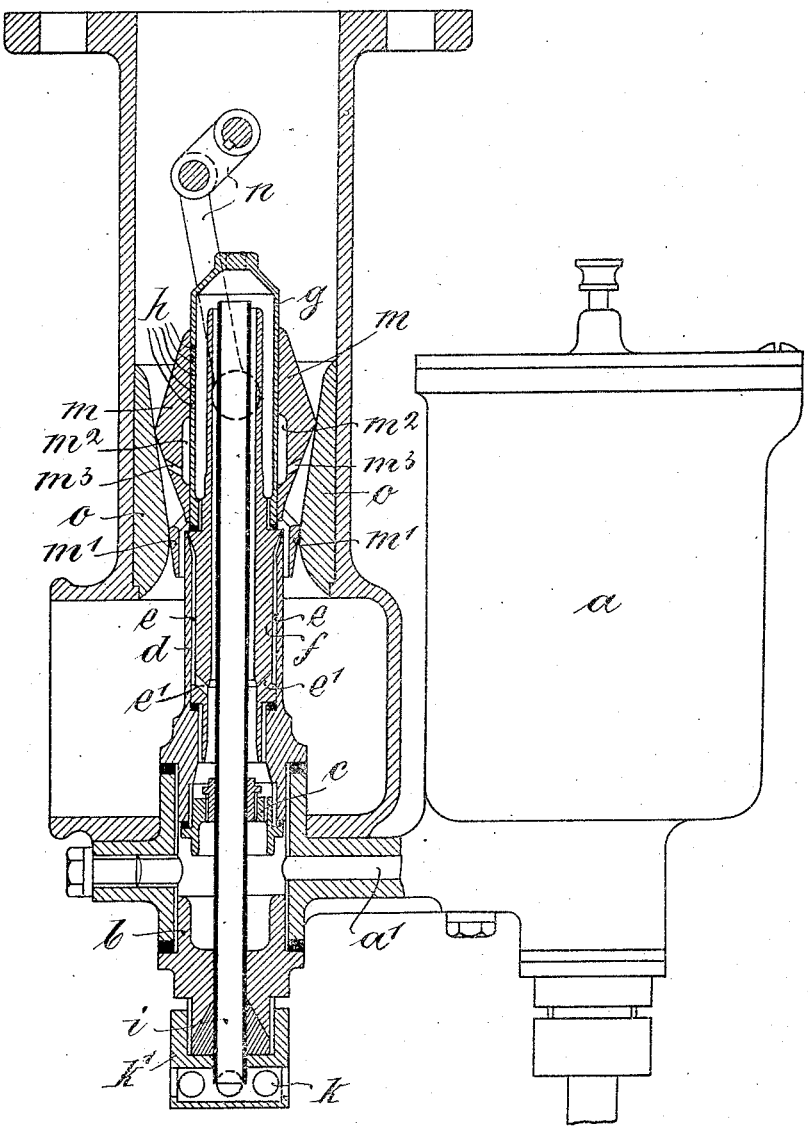

UNITED STATES PATENT OFFICE.

THEODOR HAEGELE, OF CANNSTATT, GERMANY.

CARBURETER.

1,152,173.  Specification of Letters Patent.  Patented Aug. 31, 1915.

Application filed June 16, 1914.   Serial No. 845,478.

*To all whom it may concern:*

Be it known that I, THEODOR HAEGELE, subject of the King of Wurttemberg, residing at 51 Olgastrasse, Cannstatt, Wurttemberg, Germany, have invented certain new and useful Improvements in Carbureters, of which the following is a specification.

This invention relates to carbureters for internal combustion engines and has for its object to enable a uniform mixture of air and fuel to be obtained at all engine speeds and thus to enable the fuel consumption to be reduced to a minimum.

Owing to the fact that the velocity at which the air or mixture is induced increases and decreases during each revolution of the crank-shaft in accordance with the speed of the engine piston, it is necessary in order to obtain a constantly uniform mixture, either to maintain the velocity of the air past the jet nozzle constant or to vary the suction on the fuel, that is to say, the absolute pressure bearing on the escaping fuel.

According to the present invention a uniform mixture is obtained by controlling the absolute pressure on the fuel in accordance with the suction and consequently in accordance with the speed of the engine. In order to effect this, the fuel passage in the jet nozzle to which the fuel is supplied from the float chamber is connected with a secondary passage located at the same height as the jet passage, the secondary passage being constantly open to the atmosphere and being also adapted to be put into connection with the mixing chamber or suction space of the carbureter by means of a controlling member when the suction increases owing to the increased speed of the engine piston.

In carrying out the present invention the controlling member is preferably also adapted to throttle the effective suction area and is connected with an auxiliary member which is adapted to throttle the air passage at the fuel jet outlet orifices when the controlling member is adjusted for the engine to run lightly and at a slow speed, so that, although the controlling member is adjusted so that only a small effective suction area is left, the velocity of the air drawn past the fuel jet orifices will be sufficient to enable an efficient gas-mixture to be produced.

In order that the invention may be more clearly understood reference is made to the accompanying drawing showing the preferred construction of the improved carbureter by way of example, the drawing showing the carbureter in section.

The fuel is supplied from the float chamber $a$ through the passage $a^1$ to the jet nozzle. The latter comprises an outer tube $d$ which reaches to the height of the level of the liquid in the float chamber $a$ and a tube $f$ fitted within the tube $d$ and adapted to form a narrow annular fuel space $e$ between the two tubes, this annular space $e$ being directed outwardly at its upper end, for which purpose the outer tube $d$ is tapered at its upper end and the inner tube $f$ correspondingly shaped. It will of course be understood that instead of providing an annular fuel passage $e$, a plurality of vertical passages may be provided. The fuel is supplied to the jet passage $e$ through passages in a nut $c$ screwed into the outer tube $d$ and through holes $e^1$ in the inner tube $f$. The inner tube $f$ is reduced at its upper end and over the same is fitted a hood $g$ having suction orifices $h$ in its side walls, the hood $g$ being preferably screwed on to the tube $f$. Centrally through the tube $f$ extends an air tube $i$ which opens at its upper end above the tube $f$ into the space inclosed by the hood $g$ and is open below to the atmosphere through air inlet openings $k$ in a nut $k^1$ screwed on to the block $b$ which closes the lower end of the fuel jet nozzle. Upon the hood is slidably fitted a double conical controlling member $m$ which can be raised or lowered by mechanism $n$. The controlling member $m$ carries an auxiliary member $m^1$ which, when the controlling member $m$ is lowered, is located on a level with the upper end of the fuel passage $e$ and throttles the passage for the air between the jet nozzle and the cone $o$. The controlling member $m$ is provided with an internal recess $m^2$ into which open passages $m^3$ in the member $r$.

When starting the engine the controlling member $m$ is raised only slightly from the lowermost position illustrated in the drawing so that only a small passage exists between the controlling member $m$ and the cone $o$. The auxiliary member $m^1$ is then situated in the space between the fuel jet outlet orifices and the air cone $o$ and throttles through this space so that although only a very small space exists between the controlling member $m$ and the cone $o$, the air will be induced past the fuel outlet orifice at a sufficient velocity to insure an efficient mixture. It will be observed, however, that the controlling member $m$ cannot cause this velocity to become too great because the auxiliary member $m^1$ is so situated relatively to the controlling member $m$ that the space around the nozzle is not reduced until the apex of the controlling member $m^1$ has reduced the free passage above the nozzle to such an extent that the velocity about the nozzle cannot become excessive. If the controlling member $m$ is further raised in order to increase the effective suction area, the recess $m^2$ thereof uncovers the openings $h$ in the hood $g$, the openings being so disposed that they are entirely uncovered by the recess $m^2$ when the controlling member $m$ has been raised so that the effective suction space between the controlling member $m$ and the air cone $o$ is as large as the cross sectional area of the air space at the nozzle outlet. On uncovering the openings $h$ in the hood $g$, the fuel located between the tubes $f$ and $i$ will be subjected to suction owing to the connection of the space inclosed by the hood $g$ with the mixing chamber of the carbureter through the passages $m^3$, recess $m^2$ and openings $h$.

In every carbureter, apart from the resistances in the fuel passages variable with the speed, the quantity of fuel escaping from the nozzle depends on the area of the outlet opening and on the difference between the pressure momentarily existing in the carbureter during the suction and the pressure under which the fuel in the nozzle stands. The fuel normally stands level with the outlet opening of the nozzle $d$ under atmospheric pressure, that is to say, at the commencement of the movement of the piston or suction period. Under the action of the air drawn in between the tube $d$ and the air cone $o$, the fuel escapes from the nozzle and is entrained by the succeeding air. Simultaneously, on correspondingly adjusting the controlling member $m$, air is drawn out of the interior of the hood $g$ by the suction in the interior of the hood so that as the velocity of the air at the nozzle increases, the pressure on the escaping fuel within the nozzle is reduced to such an extent that the proportion of air to fuel remains constant. As the suction or piston velocity decreases the pressure in the interior of the hood again rises owing to the air entering the tube $i$ from below so that at the end of the suction stroke the pressure within the hood is again normal.

By reason of the suction in the hood $g$, the quantity of fuel entering the nozzle from below through the passages in the nut $c$ is considerably influenced so that even when the engine is running at the highest permissible speed, in spite of the rapidly increasing resistance in the fuel outlet passage $e$, sufficient fuel will always be supplied to the fuel passage $e$.

I claim:

1. A carbureter for internal combustion engines comprising a mixing chamber adapted to be connected to the engine and to be supplied with air, a nozzle in said chamber, a main fuel conduit in said nozzle open at one end to the interior of said chamber and adapted to be supplied with fuel at its other end, an auxiliary conduit communicating at one end with said main conduit and open at its other end to the atmosphere and means for establishing communication between the open end of said auxiliary conduit and said chamber.

2. A carbureter for internal combustion engines comprising a mixing chamber adapted to be connected to the engine and to be supplied with air, a hollow nozzle in said chamber having a passage leading from its interior and opening into said chamber, a fuel supply conduit connected to said nozzle, an air supply conduit open at its upper end to the interior of said nozzle above said passage and means for establishing communication between the upper end of said air conduit and chamber.

3. A carbureter for internal combustion engines comprising a mixing chamber adapted to be connected to the engine and to be supplied with air, a vertical hollow tube in said chamber adapted to be supplied with fuel and having a passage leading from its interior and opening into said chamber, an air tube in said hollow tube open below to the atmosphere and opening at its upper end above said hollow tube, a space being left between said tubes, a perforated hood over the upper ends of said tubes and a slidable valve fitted on said hood.

4. A carbureter for internal combustion engines comprising a mixing chamber adapted to be connected to the engine and to be supplied with air, a nozzle in said chamber having inner and outer communicating passages to which fuel is adapted to be supplied, said outer passage opening at its upper end into said chamber, a perforated hood into which the upper end of said inner passage opens, an atmospheric connection to said hood, a double conical valve slidable on said hood and having passages therethrough adapted to register with the perforations in said hood and an annular upwardly tapering cone in said mixing chamber around the upper end of said nozzle.

5. A carbureter for internal combustion engines comprising a mixing chamber adapted to be connected to the engine and to be supplied with air, a fuel jet nozzle in said chamber having a fuel outlet orifice, a double conical member slidable on said nozzle, an annular upwardly tapering cone in said mixing chamber around the upper end of said nozzle and a member depending from said conical member and adapted to throttle the space around said fuel outlet orifice.

6. A carbureter for internal combustion engines comprising a mixing chamber adapted to be connected to the engine and to be supplied with air, a nozzle in said chamber having inner and outer communicating passages to which fuel is adapted to be supplied, said outer passage opening at its end into said chamber, a perforated hood into which the upper end of said inner passage opens, an atmospheric connection to said hood, a double conical valve slidable on said hood and having passages therethrough adapted to register with the perforations in said hood, an annular upwardly tapering cone in said mixing chamber around the upper end of said nozzle and a member depending from said valve and adapted to throttle the space around the upper end of said outer passage.

In testimony whereof I affix my signature in presence of two witnesses.

THEODOR HAEGELE.

Witnesses:
 FRIDA KLAIBER,
 ERNEST ENTENMANY.